W. DIXON.
Hay Rake and Loader.
No. 28,839.
Patented June 26, 1860.
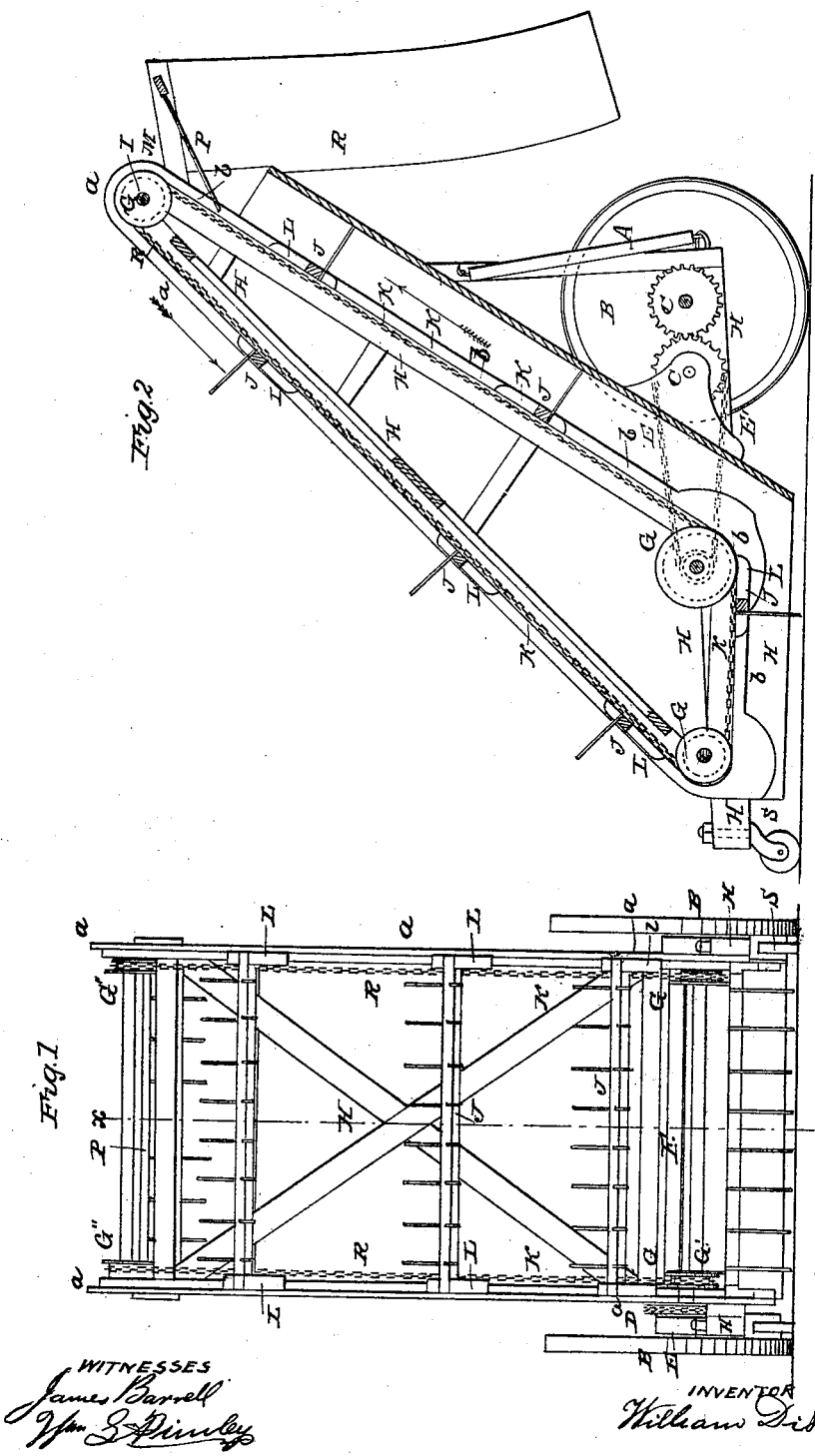
WITNESSES
INVENTOR

UNITED STATES PATENT OFFICE.

WILLIAM DIXON, OF CHICAGO, ILLINOIS.

IMPROVEMENT IN LOADING HAY.

Specification forming part of Letters Patent No. 28,839, dated June 26, 1860.

*To all whom it may concern:*

Be it known that I, WILLIAM DIXON, of Chicago, in the county of Cook and State of Illinois, have invented a new and useful Machine for Raking and Loading Hay; and I do hereby declare that the following is a full, clear, and exact description thereof, reference being had to the accompanying drawings, forming a part of this specification, in which—

Figure 1 represents a front elevation of my improved hay rake and loader; and Fig. 2 is a longitudinal vertical section taken through Fig. 1, as indicated by the red line $x\ x$ marked thereon.

Similar letters indicate corresponding parts in both figures.

The object of this invention is to rake hay from the ground and elevate it to a determined height and deposit it into a wagon or other vehicle which is to be drawn over the hay after it has been cut and dried, by which much time and labor are economized in harvesting hay.

To enable those skilled in the art to fully understand my invention, I will proceed to describe its construction and operation.

The machine, which is mounted upon two large driving-wheels, is to be attached to the hind axle-tree of a wagon or other vehicle for receiving the load of hay by means of shafts A A. (Shown in Fig. 2.) These shafts connect with the frame H in the fore part of the machine.

The wheels B B are driving-wheels, and on one end of the axle of these wheels, inside of the frame, is a spur-wheel, C, which engages with spur-wheel C', fixed to a chain-pulley, D, over which a chain, E, passes. This chain E communicates with a shaft, F, which has two chain-wheels, G G, fixed to it on either side and on the inside of frame H. Further, in the rear of these chain-wheels G G are two other chain-wheels, G' G', turning with their shaft, which has its bearings in each side of the frame H, like the shaft of wheels G G. In the top of frame H are two other chain-wheels, G'' G'', fixed to and turning with their shaft I, which also has its bearings in each side of the frame H. This frame H is triangular, with its base horizontal and the front and rear ends inclined, as represented by Fig. 2, so that the hay will not be liable to fall from the rakes while they are ascending, and so that the front end will project over the cart or wagon for receiving the hay.

The heads of the rakes J J J J are all attached to endless chains K, with their tines projecting outward. These rakes are placed upon the chains at regular intervals apart, and have pieces L L secured to each end, which serve as guides and to keep the rakes at right angles to their chains during their entire revolution around the frame H. The rakes are prevented from lateral play in their ascending movement by ledges or strips $a\ a$ on the inclined frame-work of the frame H, and in their downward movement by slots $b\ b$, into which the pieces L L fit. The chains K K, to which the rakes are all attached, as above stated, pass around the three pairs of chain-pulleys G G, G' G', and G'' G'', and are moved by these wheels as the machine is drawn along over the cut hay, and with them the rakes J, in the direction of the arrows indicated upon Fig. 2.

From the summit of the frame H proceed forward two arms, M, to which the stationary fork P is attached. The teeth of this fork proceed back a suitable distance to remove the hay from the revolving rakes, so that it will fall directly into the wagon for receiving it. The apron R under the fork prevents the hay from being scattered or blown away by the wind while it is falling from the fork to the wagon.

If it is desired to collect and deposit the hay in windrows upon the ground, it is only necessary to turn the apron R one side, so that it will not deposit in the wagon, but will cause the hay to fall upon the ground. The hay may also be collected and dumped upon the ground in cocks, if desired, by looping or closing up the lower end of the apron until sufficient hay to form a cock has collected, and then suffering it to fall upon the ground.

The rear end of the frame H rests upon rollers or caster-wheels S, which admit of its being turned with facility in any direction.

Having thus described my invention, what I claim, and desire to secure by Letters Patent, is—

The arrangement of the endless chains K, rake-teeth J, guide-pieces L, stationary rake P, apron R, and caster-wheel S, as and for the purpose herein shown and described.

WILLIAM DIXON.

Witnesses:
JAMES BARRELL,
W. S. FINLEY.